March 3, 1964 — D. B. GIACALONE — 3,123,758

BATTERY CHARGING

Filed March 2, 1962 — 2 Sheets-Sheet 1

INVENTOR.
DINO B. GIACALONE

BY Charles A. McClure

ATTORNEY

March 3, 1964  D. B. GIACALONE  3,123,758
BATTERY CHARGING

Filed March 2, 1962  2 Sheets-Sheet 2

INVENTOR.
DINO B. GIACALONE
BY
Charles A. McClure
ATTORNEY

United States Patent Office
3,123,758
Patented Mar. 3, 1964

1

3,123,758
BATTERY CHARGING
Dino B. Giacalone, Philadelphia, Pa., assignor to John R.
Hollingsworth Co., Phoenixville, Pa., a corporation of
Pennsylvania
Filed Mar. 2, 1962, Ser. No. 177,027
9 Claims. (Cl. 320—36)

This invention relates to electrical battery charging and concerns especially the prevention of overcharging of storage batteries.

As is well known, charging of storage batteries is conducive to gasification of the electrolyte, and overcharging frequently results in structural damage to the electrodes because of excessive expansion and contraction. Attempts to calculate and impose a variable charging rate are necessarily imperfect, involving approximations of charge, temperature, or other condition, or requiring complex equipment whose utility is outweighed by its initial cost or upkeep.

A primary object of the present invention is a system for optimum control of battery charging rate.

An object is gradual reduction of the rate of charge in accordance with the rise in charge of a battery being charged under otherwise suitable conditions.

Another object is provision of means for sensing too high a rate of charge applied to a battery, especially during the final portion of the charging process.

A specific object is construction of a vented battery cap as an element in a battery charging control system.

A further object is provision of battery charging control means usable with conventional battery chargers.

Other objects of this invention, together with means and methods for attaining the various objects, will be apparent from the following description and the accompanying diagrams.

In general, the objects of the present invention are accomplished, in a system for electrically charging batteries, by means of a temperature-sensitive device exposed to flow of gas evolving from a battery being charged. The temperature-sensitive device is connected, according to a preferred embodiment of this invention, in an electrical bridge circuit with a like temperature-sensitive device not exposed to the flow but only to an essentially stagnant accumulation of the gas evolved from the battery, and the output of the bridge is applied to control the battery charger. The invention contemplates incorporation of the pair of temperature-sensitive devices in a vented battery cap of unique design.

Figure 1:
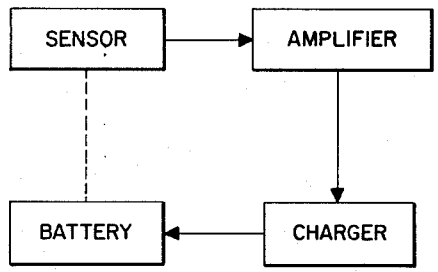
FIG. 1 is a block diagram indicating the relationship of various components to one another according to this invention.

FIG. 1 shows in block form the major components of the system of the present invention. The sensor connects physically (indicated by broken lines) to the battery and connects electrically (solid line) to the amplifier. The amplifier is connected electrically to the charger, and the charger in turn to the battery. Details of these interconnections and some of the elements of the various components appear in the succeeding views.

Figure 2:
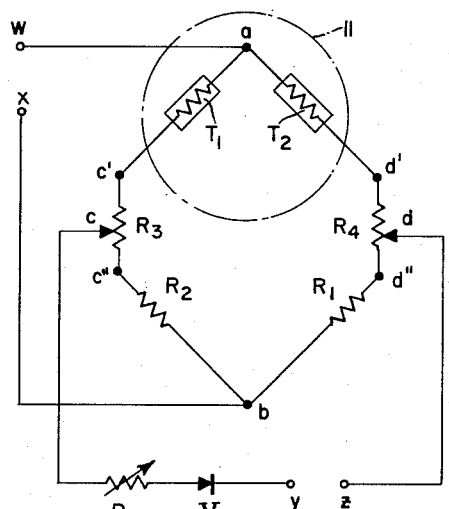
FIG. 2 is a circuit diagram of sensing means for the sensor of FIG. 1.

FIG. 2 shows the electrical circuit of the sensor. Containing a four-arm bridge, the circuit has two input terminals $w$, $x$ and two output terminals $y$, $z$. Pair of thermistors T1, T2 (joined at terminal $a$) are located in the upper arms of the bridge, and pair of resistors R1, R2 (joined at terminal $b$) in the lower arms, with T1 and R1 being in opposite arms from one another and T2 and R2 in the other opposite arms. Terminals $c$ and $d$ are adjustable taps of resistors R3 and R4 located in respective sides (partly in each adjacent arm) of the bridge between pairs of terminals $c'$, $c''$ and $d'$, $d''$. Located in the output lead from $c$ to $y$ are series resistor R5 and diode V. The elements encircled by a broken line are segregated as shown in the next view.

Figure 3:
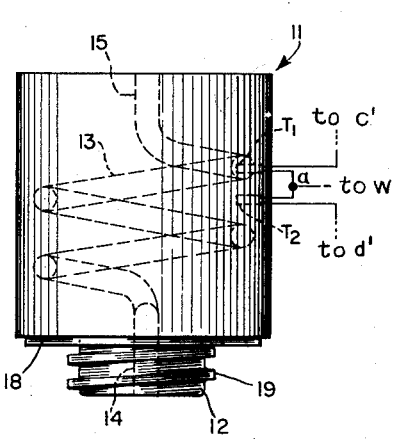
FIG. 3 is a side elevation of a vented battery cap incorporating certain of the circuit elements of FIG. 2.
Figure 4:
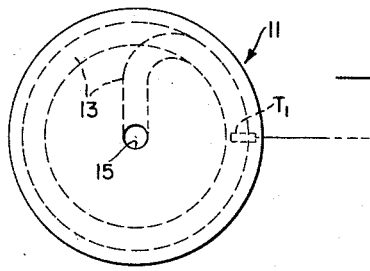
FIG. 4 is a plan view of the battery cap of FIG. 3.

FIG. 3 shows in side elevation, and FIG. 4 in plan, battery cap 11 constructed according to this invention and containing at least the thermistors of the immediately preceding view. Helical passageway 13 is visible (broken lines) in the interior of the plug, which here is considered to be transparent glass, ceramic, or plastic with the passageway simply molded therein. Entrance 14 to the passageway is centered in the base of the plug, and exit 15 in the top. Base 12 of the plug has a reduced diameter and carries sealing gasket 18 against the shoulder formed by the reduction in diameter. Standard thread 19 appears on the base. Embedded in the right side of the cap, somewhat more than halfway from the base to the top, are thermistors T1 and T2. T1 extends into a coil or convolution of helical passageway 13, while T2 is located nearby but outside the passageway. The leads from the thermistors are marked in accordance with the terminal markings in FIG. 2.

Figure 5:
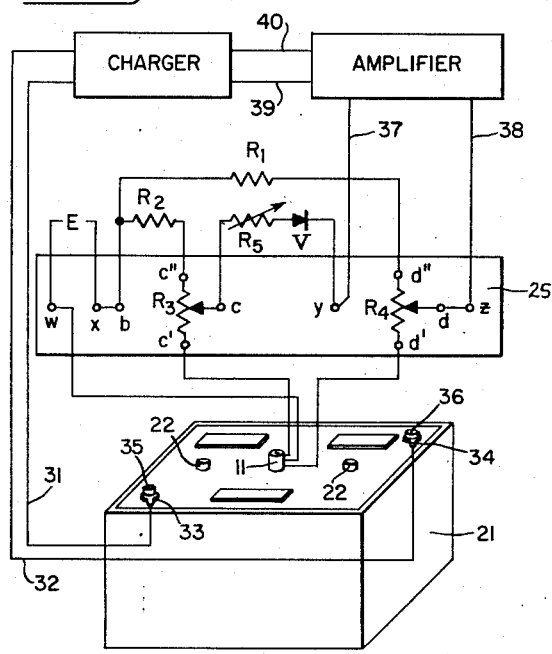
FIG. 5 is a schematic representation corresponding to the block diagram of FIG. 1 and to the intervening views.

FIG. 5 is a largely schematic representation showing interconnection of the various components in accordance with the preceding views. Battery 21 has two conventional vented caps 22 flanking cap 11 of this invention, each sealed to an opening in the top of the battery. Electrical leads from cap 11 go to junction strip 25, which mounts the terminals (except $a$) previously indicated; the top lead (cf. FIG. 3) connects to terminal $c'$, the middle lead to terminal $w$, and the bottom lead to terminal $d'$. Bridge source potential E, which may be taken from the amplifier power supply or may be any suitable D.-C. (or A.-C.) source, is shown connected across terminals $w$, $x$. Adjustable resistors R3 and R4 are shown mounted on the junction strip, and bridge resistors R1 and R2 are shown just above the strip and connected to the appropriate terminals thereon, as are series load resistor R5 and diode V.

Leads 37, 38 from terminals $y$ and $z$ on the strip go to the amplifier, which itself is wholly conventional and, therefore, is still shown in block form, at the upper right in FIG. 5. At the upper left in this view is the charger, which (also being conventional) is shown in block form too. Pair of output leads 31, 32 from the charger terminate in clips 33, 34, which connect to respective terminal posts 35, 36 of the battery being charged. Simple interconnection of the amplifier and charger by pairs of leads 39, 40 is indicated, without a showing of the component parts so connected.

This showing is compatible with both rectifier and motor-generator types of chargers. Thus, leads 39, 40 may connect, inside the charger, with a control winding in the primary of a saturable transformer having the secondary thereof driving a full-wave rectifying circuit. Alternatively, leads 39, 40 may connect to the field winding of a D.-C. generator, in opposition to the exciting current flowing through the winding. In any event, unbalance of the bridge in the sensor, leading to increased output of the bridge, is amplified and applied to the charger to reduce the charging current flowing into the battery.

Resistor R5, which is adjustable, limits the potential applied across series diode V, which preferably is of semiconductor type. This resistor functions as a sensitivity control, and it may be set to tolerate a certain amount of gassing from the battery before the conduction potential is actually reached at the diode. Of course, there is no input signal to the amplifier from the bridge unless the diode is conducting; the signal is unidirectional because there is essentially no reverse conduction through the diode. In general, each different amplifier will require a different adjustment of resistor R5 to attain the desired control over the charging rate.

If desired, resistor R5 itself may be of thermistor type, characterized by a substantial negative temperature-coefficient of resistivity. Use of a thermistor in place of all or part of (or in addition to) resistor R5 permits satisfactory operation over a wide range of ambient temperature without necessity of resetting the sensitivity adjustment.

The thermistors in the bridge are maintained (by the bridge current flowing through them) at an elevated temperature, such as in the range of 100° to 150° C. The temperature range of gas evolved from the battery electrolyte is, of course, appreciably lower. The values of the circuit elements are selected and adjusted so that the bridge output signal is within the range of about 0.2 to 2 milliamperes at visibly perceptible gassing. As both thermistors are subject to much the same environment, wide variations in ambient temperature will affect both sides of the bridge substantially equally, leaving the output unchanged.

The inside diameter of the helical or similarly convoluted tubing conveniently approximates one-half centimeter. It is important that the tube be sufficiently convoluted to provide a total length of about twenty-five centimeters, or more, so that water vapor evolved from the electrolyte may cool sufficiently to condense and return to the battery rather than escaping through the exit or vent of the cap. The passageway may be formed solely of the cap material, which may be transparent as mentioned above, or may be of opaque glass, ceramic, plastic, rubber, metal, or other suitable material, which should be inert to the battery electrolyte, of course. The passageway may be lined with a material dissimilar to the cap composition, if desired. Plug-in connections for the leads may be provided for convenience. As previously suggested, all the sensor elements could be located in the cap, although only the two thermistors need be, or the others may be contained in the leads to the amplifier or included in the amplifier itself.

Figure 6:
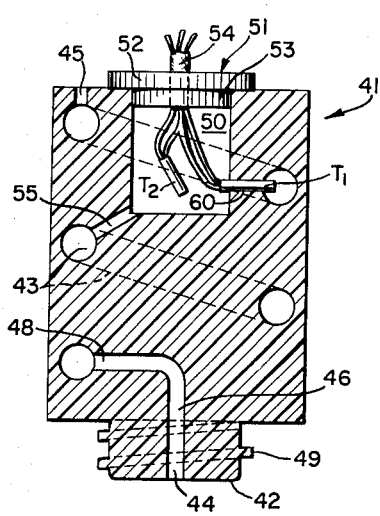
FIG. 6 is a longitudinal section of a modification of battery cap of this invention.

FIG. 6 shows, in medial vertical section, another embodiment of battery cap according to this invention. This cap 41 has helical passageway 43 interconnecting outlet or vent 45, which is located near one side edge of the top, with inlet 44 in the center of base or bottom portion 42, which has thread 49 on it and may be surrounded by a gasket (not shown) like gasket 18 previously shown. The inlet interconnects in the base to the helical passageway via intermediate passages 48 and 46, which are perpendicular to one another (horizontal and vertical, respectively). The center of the top is bored to provide enclosure 50, which has cover 51 sealing it off from the exterior. Plug portion 53 of the cover fits inside, while flange portion 52 overlaps the surrounding portion of the cap top. The leads to thermistors T1 and T2 have common wrapper 54 about them and extend through an aperture (indicated by broken lines) in the cover. T2 is suspended in the enclosure, while T1 fits snugly within radial or transverse bore 60 (which interconnects the enclosure with a convolution of the helical passageway) and extends into the passageway. Bleedway 55, slanting downward from the floor of enclosure 50, also interconnects the enclosure with the passageway. This cap, like that previously shown, may be molded in one piece.

Whereas thermistor T1 (which may be considered the "sensing" thermistor) is exposed to the flow of gas evolving from the battery, thermistor T2 (which may be considered the "reference" thermistor) is located in an essentially stagnant atmosphere of such gas contained in the covered enclosure 50. Interchange of gas between the enclosure and the helical passageway, which receives the gas flow from the battery, is relatively slow because of the small size of bleedway 55 but does take place. Accordingly, both thermistors in this embodiment are exposed to identical environments except that the relatively rapid flow of evolved gas over thermistor T1 provides a much greater rate of heat exchange than occurs between thermistor T2 and the surrounding accumulation of like gas.

Figure 7:
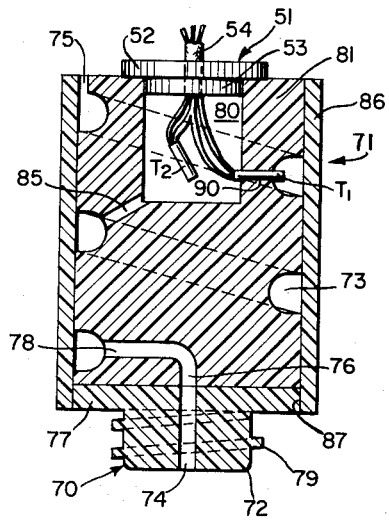
FIG. 7 is a similar section of a further modification of battery cap according to this invention.
Figure 8:
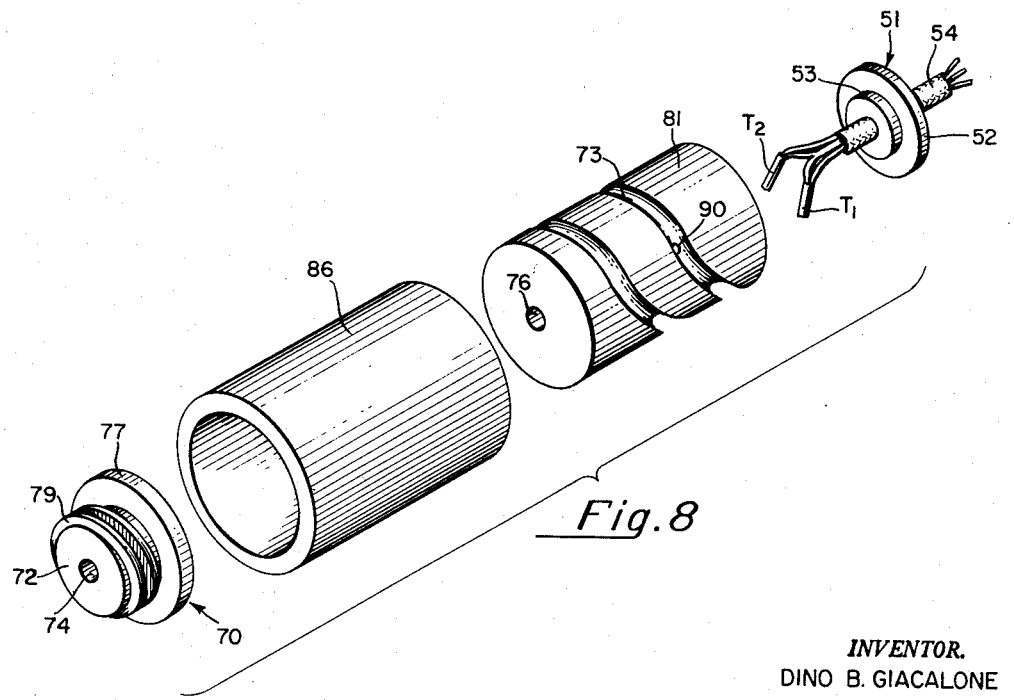
FIG. 8 is an exploded perspective view of the battery cap of FIG. 7.

FIGS. 7 and 8 show, in medial vertical section and in exploded perspective, respectively, a further modification of battery cap according to this invention. This cap 71 is much like the embodiment last shown; thus, it has like cover 51 for enclosure 80 (identical with enclosure 50 of cap 41) interconnected with helical passageway 73 by radial or transverse bore 90 and oblique bleedway 85 (cf. 43, 60, and 55 respectively, of cap 41). Helical passageway 73 of this embodiment is D-shaped in transverse section, being formed from a round-bottomed channel in the peripheral surface of generally cylindrical body portion 81 of the cap, which is snugly surrounded by sleeve 86. Vent 75 is formed between the body portion and the separate sleeve by relief of the top edge (at the left in FIG. 7) of the body down to the top edge of the channel. Also separate from the body portion is bottom portion 70, which has flange 77 adapted to fit within recess 87 provided (v. FIG. 7) by projection of the lower edge of the sleeve beyond the bottom of the body. Base 72 of the separate bottom portion has inlet 74 centrally located and carries thread 79 about its peripheral surface. The inlet connects with vertical passage 76, which in turn connects with horizontal passage 78 to the helical passageway.

The three separate portions (body, bottom, and sleeve) of cap 71 may be retained in place by any suitable means, preferably adhesive. The bottom portion, especially, may be removably secured by a press-fit, set-screw, etc., where interchangeability for use with batteries of differing thread or size of cap-receiving opening is desirable. It will be apparent, too, that the three-piece construction simplifies the molding considerably, in comparison with the one-piece construction of the caps previously shown. Regardless of the number of pieces involved, each of the embodiments illustrated and described herein effectuates one or more of the purposes of this invention.

Some of the benefits and advantages of utilizing this invention have been mentioned above. Its use takes the guesswork and risk out of battery charging, thereby favoring increased battery life. The reduction in gassing, especially during the final portion of the charging process, saves electrolyte and minimizes consumption of electric power, much of which formerly was wasted in decomposing the electrolyte. A single resistor setting is enough, and for general use this setting can be made at the factory, either to accommodate the particular amplifier (and charger) to be used, or for a high-gain amplifier, whereupon the user can readjust it for use with an amplifier having lower gain, or for a higher (or lower) degree of control as may be desired. Otherwise, the user has nothing to do but to replace a conventional vented cap with the cap of this invention and connect the leads from it to the amplifier, which may be incorporated in the charger circuit. The invention is particularly valuable in the charging of industrial batteries, which are expensive and troublesome to replace. In actual practice the apparatus of this invention will pay for itself many times over.

I claim:
1. In an electrical system including a battery and a battery charger, means responsive to evolution of gas from the battery during charging and adapted to control the charging rate and thereby appropriately limit the evolution of gas from the battery, comprising a device having an electrical characteristic subject to change in accordance with change in temperature of the device, means for maintaining the device normally at a temperature different from the temperature of gas evolved from the battery, whereupon exposure of the device to flow of the evolved gas is accompanied by an exchange of heat therewith and an accompanying change in the temperature of the device, and means responsive to the accompanying change in the electrical characteristic of the device when so exposed.

2. In an electrical system including a battery and a battery charger, means responsive to evolution of gas from the battery during charging and adapted to control the charging rate and thereby appropriately limit the evolution of gas from the battery, comprising a thermistor exposed to flow of gas evolved from the battery, a reference thermistor similar thereto exposed to such evolved gas in an essentially stagnant condition only, means for heating both thermistors and thereby maintaining them at a temperature appreciably above the normal gas temperature, whereby flow of evolved gas against the thermistor exposed thereto is effective to lower its temperature below that of the reference thermistor, and means for detecting the resulting difference in temperature of the thermistors.

3. As a sensor unit for controlling an electrical system including a battery and a battery charger, a bridge circuit having a pair of input terminals and a pair of output terminals and including a pair of thermistors in adjacent arms of the bridge, a source of potential applied across the input terminals of the bridge and to adjacent ends of the thermistors, and a series load device connected across the output terminals of the bridge and to the opposite ends of the thermistors, one of the thermistors being exposed to flow of gas evolved from the battery upon charging thereof, and the other of the thermistors being exposed to an essentially stagnant accumulation of such evolved gas.

4. The apparatus of claim 3 wherein the series load device includes a diode and an adjustable resistor.

5. In a control system for a battery charger, a hot-wire bridge having one temperature-sensitive resistor exposed to flow of gas evolved from a battery being charged by the battery charger, and having a like temperature-sensitive resistor located near the first resistor and in an identical environment except that the gas evolved from the battery being charged is essentially stagnant when in contact with the second resistor, and an amplifier connected to the bridge output and effective to magnify a signal produced upon unbalance of the bridge for application to the battery charger to control the rate of charge of the battery thereby.

6. In a vented cap for a rechargeable battery, a pair of temperature-sensitive elements, one being located in the venting path to the exterior from the interior of the battery and the other being located nearby inside the cap but outside the venting path, and electrical leads to the respective temperature-sensitive elements.

7. Vented cap for a rechargeable battery having an opening adapted to receive the cap, comprising a convoluted open-ended tube one end of which is juxtaposable in sealed relationship to the opening in the battery, a first thermistor located in one convolution of the tube, and a second thermistor located near the first thermistor but outside the tube, and electrical leads from the thermistors.

8. The article of claim 7 wherein the second thermistor is located in an enclosure in the cap, and a bleedway interconnects a convolution of the tube with the enclosure.

9. In an electrical system including a battery and a battery charger, the combination of a vented cap for the battery comprising a convoluted open-ended tube, one end of which is juxtaposable in sealed relationship to an opening in the battery and the other end of which is open to the exterior, the cap being adapted to support a first thermistor in a convolution of the tube therein for exposure to such evolved gas and a second thermistor located near the first thermistor but outside the tube, means responsive to evolution of gas from the battery during charging and adapted to control the charging rate and thereby appropriately limit the evolution of gas from the battery, including a first thermistor supported by the cap in a convolution of the tube therein and exposed to flow of gas evolved from the battery, a second thermistor similar thereto and supported nearby by the cap but outside the tube therein for reference, means for heating both thermistors and thereby maintaining them at a temperature appreciably above the normal gas temperature, whereby flow of evolved gas against the thermistor exposed thereto is effective to lower its temperature below that of the reference thermistor, and means for detecting the resulting difference in temperature of the thermistors.

References Cited in the file of this patent

UNITED STATES PATENTS

| | | |
|---|---|---|
| 1,183,810 | Gardiner | May 16, 1916 |
| 1,314,629 | Andres | Sept. 2, 1919 |
| 1,931,906 | Smith | Oct. 24, 1933 |
| 2,498,814 | Little et al. | Feb. 28, 1950 |
| 2,906,806 | Riggs | Sept. 29, 1959 |
| 2,937,223 | Thompson | May 17, 1960 |
| 2,965,830 | Isel | Dec. 20, 1960 |
| 3,047,235 | Eshbaugh et al. | July 31, 1962 |

FOREIGN PATENTS

| | | |
|---|---|---|
| 1,084,681 | France | July 13, 1954 |